July 25, 1939.  H. D. COCHRAN ET AL  2,167,293
SPEED CONTROL FOR COMBUSTION ENGINES
Filed Oct. 19, 1938  2 Sheets-Sheet 2
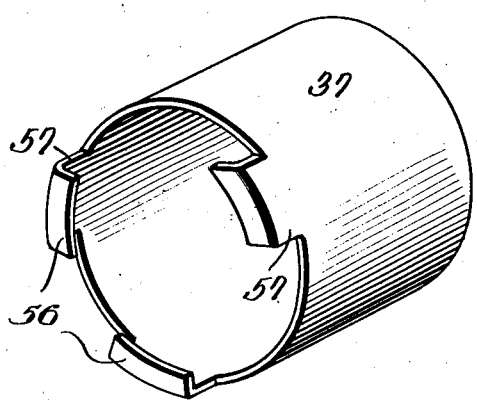
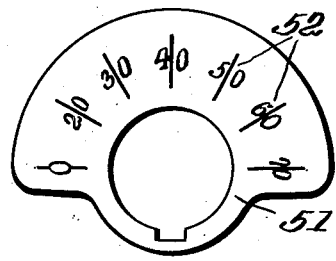
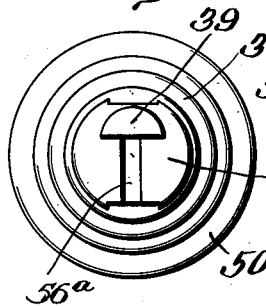
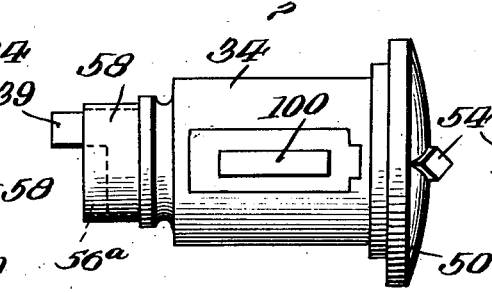
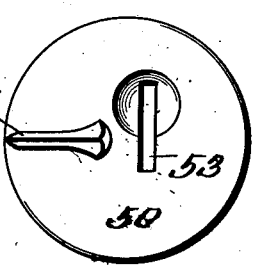
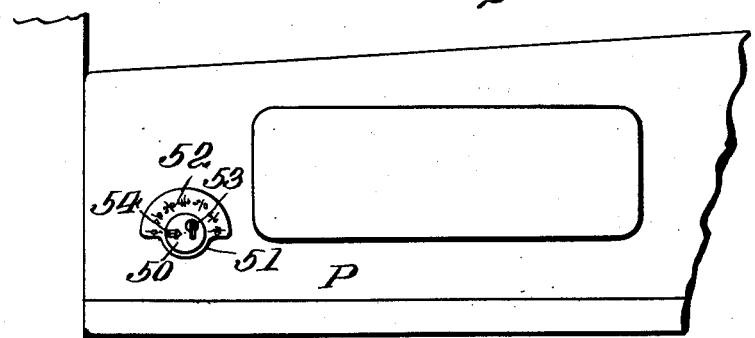

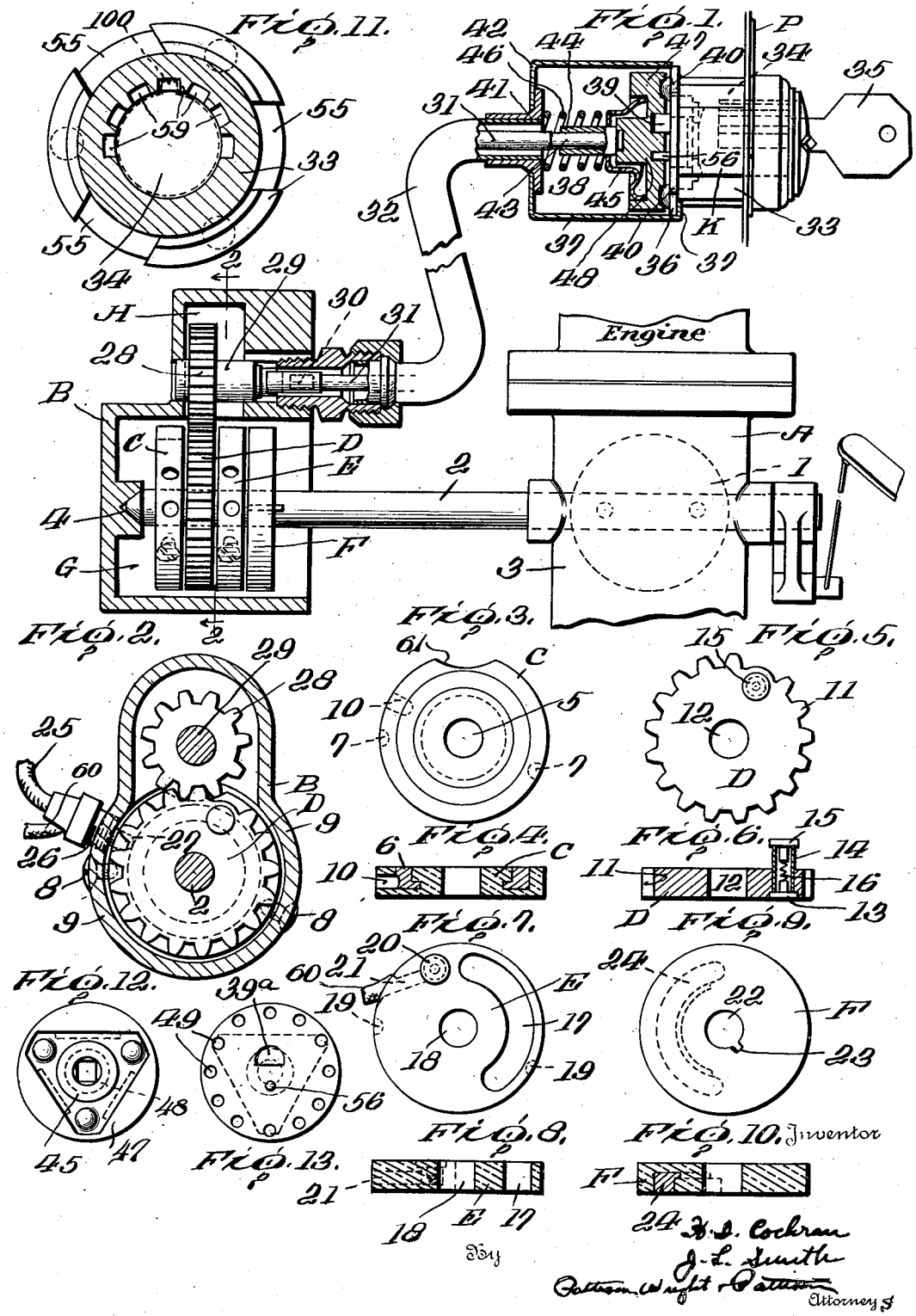

Patented July 25, 1939

2,167,293

UNITED STATES PATENT OFFICE 2,167,293

SPEED CONTROL FOR COMBUSTION ENGINES

Harry D. Cochran and John L. Smith, New Castle, Pa.

Application October 19, 1938, Serial No. 235,847

18 Claims. (Cl. 123—102)

The present invention pertains to a speed control for combustion engines and comprises more particularly a mechanical device which may be set by a key to prevent operation of the engine at any speed beyond a predetermined maximum.

The present invention as a consequence has as its main object the provision of an improved speed control for the engine in motor vehicles and as a further object a speed control the setting of which is within the discretion of the vehicle driver.

Another and further object of the invention is the provision of an improved vehicle speed control the actuation of which is obtained through the vehicle accelerating means and which controls the speed of the vehicle by breaking or stopping the delivery of electric current to the engine of the vehicle.

Another object of the invention is the provision of a speed control having the aforementioned and described attributes which is comparatively cheap and simple to manufacture, highly efficient in operation, and which is adaptable as an attachment to the combustion engine of any motor vehicle now in use.

Other specific objects, novel features of construction and improved results of the present improved invention will appear in more detail from the following description when read in the light of the accompanying drawings.

A still further object of the invention is that of rendering a vehicle when the engine is provided with this device practically theftproof. This is accomplished by setting and locking the speed control at zero whereby the vehicle can not be driven at a speed any greater than five miles per hour, even if the vehicle owner should leave the ignition key in the ignition lock.

In the drawings:

Fig. 1 is a view illustrating the application of the invention to a motor vehicle, portions of the view being in vertical section to more clearly illustrate the construction.

Fig. 2 is a vertical sectional view taken on the line 2—2 of Fig. 1 looking in the direction indicated by arrow.

Fig. 3 is a plan view of one of the control or contact discs.

Fig. 4 is a vertical sectional view through the contact disc of Fig. 3.

Fig. 5 is a plan view of the drive gear contact disc.

Fig. 6 is a vertical sectional view through the disc of Fig. 5.

Fig. 7 is a plan view of the third contact disc.

Fig. 8 is a vertical sectional view through the disc of Fig. 7.

Fig. 9 is a plan view of the fourth contact disc.

Fig. 10 is a vertical sectional view through the contact disc of Fig. 9.

Fig. 11 is a vertical sectional view through the lock.

Fig. 12 is an end or plan view of one of the mechanical elements which cooperate with the lock.

Fig. 13 is an end or plan view of a second mechanical element which cooperates with the lock.

Fig. 14 is a perspective view of the housing which cooperates with the lock.

Fig. 15 is a front view of the speed setting dial.

Fig. 16 is a side view of the lock tumbler housing.

Fig. 17 is a view of one end of the lock tumbler housing.

Fig. 18 is a view of the opposite end of the lock tumbler housing.

Fig. 19 is a fragmentary front view of the vehicle dash.

Having reference now to the drawings in which one embodiment of the invention is illustrated, and in which like parts are designated by similar reference numerals throughout the description, A designates the conventional and usual carburetor used in connection with an automobile engine. This carburetor is provided with the usual throttle or butterfly valve 1 which is actuated in the usual and conventional manner from the driver's seat of the vehicle by the driver thereof. The butterfly valve, as will be clearly understood, oscillates with its shaft 2 when it is actuated by the vehicle driver for controlling or varying the speed of the motor vehicle. In the adaptation of the present invention to the carburetor the butterfly or throttle valve shaft 2 is a special shaft in that it is elongated and extends outwardly through and beyond the carburetor manifold pipe 3.

A housing or casting B, preferably aluminum, is positioned adjacent the carburetor and supported in proper position by any conventional and well known means such as a bracket (not shown) and the throttle valve shaft 2 extends through this housing and has its outer end supported as at 4 on one wall of the housing B.

A series of contact discs or plates each designated as an entirety by C, D, E and F respectively are disposed within the main chamber G of the housing and upon the throttle valve shaft 2.

The construction of these discs is clearly illustrated in Figs. 3 to 10 inclusive and will now be described.

Each of the discs is circular in shape and they are all preferably made of Bakelite although any other suitable non-current conducting material could be used. The disc C is mounted adjacent that end of the shaft remote to the carburetor and is provided with a central circular opening or passageway 5 for the reception of the throttle shaft. In its outer face a brass or other suitable metal ring 6 is inset. At opposite points in its peripheral edges the disc is provided with indentures 7 which receive the ends of the screws 8 which pass through the side walls 9 of the housing. These screws hold the disc in proper position upon the shaft and prevent possibility of rotation of the disc. The disc is further provided in its peripheral edge with a passageway 10 the inner end of which ends at the brass ring 6. The purpose of this passageway will be pointed out hereinafter.

The disc D is in the form of a gear being provided with teeth 11. Centrally the disc is provided with a circular passageway 12 for the reception of the throttle shaft 2. This gear rotates freely on the throttle shaft and on its face which is adjacent the disc C it is provided with a metallic circular shaped contact 13. A metallic cage 14 extends from the contact 13 through and beyond the other face of the disc. A metallic contact 15 is positioned on the outer end of the cage and is urged normally outwardly therefrom by a coil spring 16.

The next disc E is provided with an arcuate shaped passageway 17 through which the cage 14 of the disc D extends so that the contact 15 will abut and engage the next and last disc F. The disc E is provided centrally with a circular shaped passageway 18 for the reception of the throttle shaft 2. The throttle shaft 2 passes loosely through this opening and this disc is held in proper set position on the shaft in the same manner as has been described in respect to the disc C, namely, by screws (not shown) the ends of which extend into indentures 19 provided in the peripheral edge of the disc. A circular shaped contact 20 is positioned on the face of this disc which is adjacent the disc F and a passageway 21 extends from this contact outwardly through the peripheral edge of the disc.

The third and last disc F is provided with a centrally disposed passageway 22 for the reception of the throttle shaft and a keyway 23 so that the disc may be keyed to the shaft and be rotatable therewith. An arcuate shaped metal contact 24 is in that face of the disc which opposes the disc E.

From the construction thus far described it will be apparent that the series of discs form a continuous electric circuit through engagement of the several contacts. These discs are placed in the electric ignition system of the vehicle engine and particularly in that wire of the ignition system which runs from the ignition switch ordinarily placed on the dash of the vehicle to the distributor of the engine.

In Fig. 2 of the drawings 25 indicates an electric wire running from the conventional ignition switch and this wire is led to and suitably attached as at 26 to the side of the housing or casing B and is provided with an extension contact portion 27 which extends through the opening 10 in the disc C and has current conducting contact with the ring 6. Following the course of the current it will now be seen that from the ring 6 the current travels through the contact 13 on the disc D which contact has engagement with the ring 6. The contact 15 at the opposite side or face of disc D contacts the arcuate shaped ring 24 on the end disc F from which contact current travels to the contact 20 on disc E which contact has rubbing engagement with the arcuate shaped contact 24. From the contact 20 a conductor 60 extends outwardly through the disc opening or passage 21 and leads to and has connection with the distributor of the engine.

The ignition system may be any that is commonly used and to adapt the present invention to the vehicle it is only necessary to interpose the contact discs C to F inclusive in one of the wires of the circuit.

The casing or housing B in addition to having a main chamber G has an upper supplemental chamber H in which is positioned a gear 28 which is of a size to extend downwardly into the lower housing chamber G and have driving connection with the contact gear disc D as is clearly illustrated in Fig. 1 of the drawings. This gear is mounted on and is rotatable with the shaft 29 to one end of which is suitably attached as at 30 one end of a flexible drive shaft 31 which is rotatable within a flexible pipe or tubing 32. This tubing with its shaft is led to an actuator designated as an entirety by K which actuator is positioned preferably on the vehicle dash P for convenient operation by the vehicle driver.

This actuator K comprises a barrel 33 within which is fitted a tumbler housing 34 whose tumbler 100 is actuated by a key 35. The barrel 33 terminates at its inner end in a head 36 to which is attached a housing 37 forming a chamber 38. The inner end of the tumbler housing is provided with an extension 39 which is of a half-moon shape and the inner end or head 36 of the barrel is provided with three outwardly extending semispherical shaped members 40 which are positioned 120 degrees apart.

For convenience to the driver of the car the actuator K is mounted on the dash P of the vehicle as is clearly indicated in Figs. 1 and 19 of the drawings. The tumbler housing at its outer end is provided with an enlarged circular head 50 which is on the driver's side of the dash and behind this head there is positioned a plate 51 carrying speed indications 52. The head is provided with a slot 53 for the reception of the key 35 and is also provided with a pointer 54 which cooperates with the speed dial to indicate the speed at which the mechanism is set.

The barrel 33 of the actuator is cut out at several points as indicated at 55 to receive the downwardly bent ends or ears 56 carried by the forwardly extending portions 57 of the housing 37. These ears are disposed behind the head 36 at the inner end of the barrel 33 as is clearly apparent in Fig. 1 of the drawings.

The flexible tubing 32 runs from the casing or housing B to the end wall 42 of the housing 37 where it is attached as at 41. The flexible shaft 31 extends into the housing chamber 38 and is provided with a squared end which has driving connection as at 43 with a sleeve 44. This connection is such as to permit endwise movement between the shaft and the sleeve without breaking the drive connection between them. The sleeve carries on its inner end a cone or bell shaped member 45. A coil spring 46 normally urges the cone and sleeve towards and holds them in engagement with the drive disc 47. The drive disc 47 has driving connection with the tumbler housing in that it is provided with a half-moon shaped opening which receives the half-moon shaped extension 39 of the tumbler housing. Additional driving connection is obtained by providing the drive disc 47 with a pin 56 which extends into a slot 56a provided in the inner end 58 of the tumbler housing 34.

The tumbler housing 34 can be rotated by the pointer 54. The tumbler housing is rotated until the pointer is opposite that speed indication on the dial at which it is desired to set the device. The speed setting of the device will determine the speed at which the device will operate to break the electric circuit to the engine. When the pointer is opposite the speed at which it is desired to set the device, the tumbler housing is held against rotation by holding the pointer and the key is then turned. This will cause the tumbler 100 to enter into locking engagement with one of the seven tumbler receiving grooves 59 in the barrel 33. It is noted that there is one tumbler receiving groove for each of the seven speed indications on the speed dial 52.

The device operates as follows: The maximum speed at which the automobile is to be permitted to travel is determined by the setting of the contact disc D, because as the throttle shaft is rotated through manipulation of the accelerator in speeding up the car the disc F is caused to rotate and can be rotated to a point where its arcuate shaped contact 24 will move off of the circular contact 15 of the disc D. As a consequence the position of the disc D will control the degree of rotation of the throttle shaft before electrical connection is broken between the contacts 15 and 24. The device is so calibrated that if the tumbler pointer is opposite the speed marking of 40 miles, the disc D will be so set that electrical contact between its contact 15 and the contact 24 of the disc F will be broken, should the throttle shaft be rotated a distance to open the throttle sufficiently far to cause the vehicle to attain a speed in excess of 40 miles per hour. From the description given it will be clear that the disc D will remain in the position at which it is set by the rotation of the tumbler housing 34. It will be apparent as the tumbler housing is rotated it in turn rotates the drive disc 47, the shaft 31, the gear 28 and through it the contact disc D. It will be further apparent that the device provides a means whereby the vehicle engine can be caused to stop at any predetermined speed attained by the vehicle.

If the device is set on the zero marking of the speed dial and the key 35 removed, the vehicle is rendered practically theft-proof in that the greatest speed which the vehicle could attain at this setting would be 5 miles per hour.

From the foregoing it will be apparent that the series of discs C to F constitute a switch in the ignition circuit of the motor and that through the instrumentality of the setting device on the dash of the vehicle the switch can be set so that it will be opened when the throttle valve reaches a predetermined position.

The disc C is cut out at one edge as clearly appears at 61 in Fig. 3 of the drawings which enables this disc to be slid along the shaft 2 with sufficient clearance to avoid engagement with the gear 28.

We claim:

1. The combination with an explosive type engine including an electrical connection for the ignition system and a fuel feeding device including a rotatable movable control means to vary the amount of fuel fed by said device to said engine, a switch in said electrical connection for the ignition system, said movable fuel feed control adapted to open and close said switch, and means to set said switch to cause the same to be opened by said fuel control at a predetermined point in the travel of said control.

2. The combination with an explosive type engine including an electrical connection for the ignition system and a fuel device including a rotatable control means to vary the amount of fuel fed by said device to said engine, a rotatable switch in said electrical connection for the ignition system, said rotatable fuel feed control adapted to rotate said switch to open and close the same, and means to set said switch to cause the same to be opened at a predetermined point in the rotative travel of said fuel control.

3. The combination with an explosive type engine including an electrical connection for the ignition system and a fuel feeding device including a rotatable control means to vary the amount of fuel fed by said device to said engine, a switch in said electrical connection for said ignition system, said switch including a plurality of contact points adjustable in respect to one another, one of said contacts being elongated and being operatively connected to said fuel control means and movable therewith, and means to set the contact point which is in electrical connection with said elongated contact point to cause the circuit to be broken between said contact points at a predetermined point in the travel of said fuel control.

4. The combination with an explosive type engine having an electrical connection for the ignition system, a fuel feeding device including a rotatable control means to vary the amount of fuel fed by said device to said engine, a series of contact points in said ignition system and constituting a switch, one of said contact points being elongated and being movable over the adjacent contact point of said series, said elongated contact point being connected with said feed control and rotative therewith, and means to set said other contact point in respect to said elongated contact point to cause the circuit to be broken between the said contacts at a predetermined point in the rotative travel of said fuel control means.

5. The combination with an explosive type engine having an electrical connection for the ignition system and a fuel feeding device including movable control means to vary the amount of fuel fed by said device to said engine, a switch in said electrical connection of said ignition system, said fuel feed control adapted to open and close said switch and manual means to set said switch to cause the same to be opened by said fuel control means at a predetermined point in the travel thereof.

6. A speed control mechanism for a gas engine having an electrical connection for the ignition system and a fuel feeding device including a rotatable valve for controlling the amount of fuel fed by said device to said engine, said valve having a shaft upon which is mounted an electric switch in the circuit of said ignition system, said switch including a pair of contact points movable in respect to one another, one of said contacts being elongated and being rotatable with said valve shaft, the other of said contacts being rotatable on said valve shaft and provided with means to lock it in its set position, said locking means including manual means to move said contact point about said shaft, the parts operating whereby the settable contact point will cause the switch to be opened by said fuel control valve at a predetermined point in the rotative travel thereof.

7. The combination with an explosive type engine having an electrical connection for the ignition system and a fuel feeding device including a movable control means to vary the amount of fuel fed by said device to said engine, a switch in the circuit of the ignition system, said movable fuel feed control adapted to open and close said switch, and means to set said switch to cause the same to be opened by said fuel control at a predetermined point in the travel of said control.

8. A speed control mechanism for an explosive type engine comprising, in combination an electrical connection for the ignition circuit for said engine, a fuel conduit provided with a rotatable fuel control valve having an extending shaft, a series of members mounted on said shaft and provided with electrical contacts in said ignition circuit, said contacts being normally in electrical connection, one of said members being fixed to said valve shaft and rotatable therewith, and rotatable in respect to a second of said members to break connection between the electrical contacts of said members and to open said ignition circuit, means operatively connected to the second of said members to rotate it in respect to the first of said members, and means to lock said second member in its set position, the parts operating as and for the purpose described.

9. A speed control mechanism for an explosive type engine, comprising in combination, an electrical connection for the ignition circuit for said engine, a fuel conduit for said engine provided with a rotatable fuel control valve, said valve provided with an extending shaft, a switch in said ignition system and supported on said shaft, said switch comprising a series of members each of which is provided with an electrical contact, said contacts normally being in electrical connection, one of said members rotatable with said control valve shaft whereby its electrical contact can be moved out of electrical connection with the remaining contacts, a second of said members rotatable on said shaft and in respect to said first member to provide means whereby electrical connection through said contacts will be broken when the first named contact member is rotated to a predetermined point, and means for setting said second contact member and locking it in its set position.

10. A construction such as defined in claim 9, wherein there is a speed reading indicator for visually indicating the speed at which said speed control is set to open said ignition circuit.

11. A speed control mechanism for an explosive type engine, comprising in combination an electrical connection for the ignition circuit for said engine, a fuel feeding device for said engine including a rotatable valve for controlling the feed of fuel to said engine, said valve provided with an elongated shaft rotatable with the valve, a housing associated with the outer end of said shaft and rotatably supporting the same, a switch in said housing and supported on said shaft, said switch being in said connection of said ignition system and including a member rotatable with said shaft and carrying an arcuate shaped electrical contact and a gear rotatable on said shaft and carrying a point contact normally having electrical engagement with said arcuate shaped contact, a second gear in said housing having driving connection with said first gear, a drive shaft extending from said second gear, manually operable means connected to said shaft for rotating the same and rotating said gear carried contact in respect to the member carried contact, and a key operated lock for locking said gear contact member in a set position, the parts operating as and for the purpose described.

12. A construction such as defined in claim 11, wherein a dial is associated with said shaft rotating means for indicating the speed at which said control mechanism is set.

13. A speed control mechanism for an explosive type engine, comprising in combination, an electrical connection for the ignition circuit, a fuel feeding device including a rotatable valve provided with an extending and rotatable shaft, a housing supporting the outer end of said shaft, a switch in said ignition circuit positioned within said housing and mounted on said shaft, said switch comprising four plates arranged in side by side relationship along said shaft and each provided with an electrical contact, the first of said plates being locked to said housing and provided with a circular contact engaging the contact carried by the next adjacent and second plate, said second contact extending through an arcuate shaped opening in the next adjacent and third plate, the contact of said second plate engaging an arcuate shaped contact carried on the next adjacent and fourth plate, said third plate having an electrical contact also engaging the arcuate shaped contact of the fourth plate, said third contact plate being locked to said housing, one of the conductors of said electrical connection being broken and having one of its ends connected to the contact of the first plate and its other end connected to the contact of the third plate, said fourth plate being rotatable with said fuel control valve shaft, said second plate being rotatable on said shaft and provided with gear teeth, a gear carried in said housing for driving connection with the teeth of said second plate, a drive shaft connected to said gear, and a manually rotatable member connected to said drive shaft, the parts operating as and for the purpose described.

14. A construction such as defined in claim 13, wherein the manually rotatable member is provided with means to lock it against rotation.

15. A construction such as defined in claim 13, wherein there is means associated with said rotatable means to indicate the setting of the speed control mechanism.

16. A construction such as defined in claim 13, wherein means is provided for locking said manually rotatable means against rotation, and means associated with said rotatable means is provided for indicating the speed setting of said control device.

17. The combination with an explosive type engine including an electrical connection for the ignition system and a fuel feeding device including a movable fuel control valve, a switch in said connection of said ignition system, said movable fuel feed control adapted to open and close said switch, manual means to set said switch to cause the same to be opened by said fuel control valve at a predetermined point in the travel thereof and a key operated lock for locking said setting means to prevent unwarranted resetting of said switch.

18. The combination with an explosive type engine including an electrical connection for the ignition system and a throttle valve, a switch in said connection of said ignition system, operative connection between said switch and said throttle valve to open said switch, and manual means for setting said switch to cause the same to be opened when the throttle valve has been opened beyond a predetermined point.

HARRY D. COCHRAN.
JOHN L. SMITH.